United States Patent
Tach et al.

(10) Patent No.: US 9,328,263 B2
(45) Date of Patent: May 3, 2016

(54) METHOD FOR PRODUCING AN ADHESIVE TAPE WITH A PROTRUDING LINER

(75) Inventors: Michael Tach, Hamburg (DE); Gabriel Markus, Hamburg (DE); Bruce Dirk Ehlers, Hamburg (DE)

(73) Assignee: tesa SE, Norderstedt (DE)

( * ) Notice: Subject to any disclaimer, the term of this patent is extended or adjusted under 35 U.S.C. 154(b) by 0 days.

(21) Appl. No.: 14/234,810

(22) PCT Filed: Aug. 2, 2012

(86) PCT No.: PCT/EP2012/065154
§ 371 (c)(1),
(2), (4) Date: Feb. 4, 2014

(87) PCT Pub. No.: WO2013/020891
PCT Pub. Date: Feb. 14, 2013

(65) Prior Publication Data
US 2014/0144578 A1    May 29, 2014

(30) Foreign Application Priority Data

Aug. 10, 2011  (DE) .......................... 10 2011 080 760

(51) Int. Cl.
| | |
|---|---|
| B65H 18/26 | (2006.01) |
| C09J 7/02 | (2006.01) |
| C09J 7/00 | (2006.01) |
| B65H 54/52 | (2006.01) |

(52) U.S. Cl.
CPC . *C09J 7/02* (2013.01); *B65H 54/52* (2013.01); *C09J 7/00* (2013.01); *B65H 2701/377* (2013.01); *B65H 2701/3772* (2013.01); *B65H 2701/3916* (2013.01)

(58) Field of Classification Search
USPC ................................ 156/188, 191, 192, 324; 427/207.1–208.4; 206/411; 242/541.7, 242/547
See application file for complete search history.

(56) References Cited

U.S. PATENT DOCUMENTS

| | | | | |
|---|---|---|---|---|
| 2,972,452 | A | * | 2/1961 | Aumann .................... 242/421.9 |
| 3,784,122 | A | * | 1/1974 | Kataoka .................... 242/525.7 |
| 3,997,122 | A | * | 12/1976 | Helfand et al. ............ 242/160.2 |

(Continued)

FOREIGN PATENT DOCUMENTS

| | | |
|---|---|---|
| EP | 0928822 A1 | 7/1999 |
| EP | 1035185 A2 | 9/2000 |

OTHER PUBLICATIONS

International Search Report of corresponding PCT Application No. PCT/EP2012/065154 dated May 31, 2013.

*Primary Examiner* — Carson Gross
(74) *Attorney, Agent, or Firm* — Norris McLaughlin & Marcus, P.A.

(57) ABSTRACT

A process for production of a crosswound long roll of an at least single-side-adhesive adhesive tape in which at least one adhesive side of the adhesive tape has been covered with a liner, in the form of an Archimedean spiral. The process releasably fixes a core on an axle, wherein the adhesive tape covered with the liner is wound on to the core, contacts a pressure roll with a curved surface of the core or with the adhesive tape which has been covered with the liner and already wound on the core, in such a way as to give a nip between pressure roll and curved surface of the core or adhesive tape covered with the liner, where core and pressure roll rotate in opposite directions. Further, the process unwinding the liner from a liner roll, places the liner on to the at least one open adhesive side of the adhesive tape which is guided on the pressure roll in the direction of the nip, and guides a laminate made of adhesive tape and liner on the pressure roll into the nip.

14 Claims, 3 Drawing Sheets

(56) References Cited

U.S. PATENT DOCUMENTS

| | | | | |
|---|---|---|---|---|
| 4,319,944 A | * | 3/1982 | Pope | 156/195 |
| 4,878,976 A | * | 11/1989 | Asakura | 156/190 |
| 5,130,185 A | * | 7/1992 | Ness | 428/41.9 |
| 2010/0119803 A1 | * | 5/2010 | Kosaka et al. | 428/222 |

* cited by examiner

METHOD FOR PRODUCING AN ADHESIVE TAPE WITH A PROTRUDING LINER

This is a 371 of PCT/EP2012/065154 filed 2 Aug. 2012 (international filing date), and claims the priority of German Application No. 10 2011 080 760.8 filed 10 Aug. 2011.

The invention relates to a process for the production of a crosswound long roll of an adhesive tape with protruding liner.

Adhesive tapes coated with adhesives on one or both sides are mostly wound up to give a roll in the form of an Archimedean spiral at the end of the production process. In order to prevent the (pressure-sensitive) adhesives from coming into contact with one another in the case of double-sided adhesive tapes, or in order to prevent adhesion of the (pressure-sensitive) adhesive on the backing in the case of single-sided adhesive tapes, the adhesive tapes are applied, prior to winding, to a protective covering material (also termed release material), which is wound up together with the adhesive tape. Protective covering materials of this type are known to the person skilled in the art as release liners or liners. Liners are used not only for the protective covering of single- or double-sided adhesive tapes but also for the covering of labels.

A liner (release paper, release foil) is not a constituent of an adhesive tape or label, but instead is merely an aid to their production or storage, or for further processing by way of example by punching. A liner is moreover unlike an adhesive tape backing in that it has not been bonded inseparably to an adhesive layer.

When a double-sided adhesive tape equipped with a liner is unrolled, the normal procedure is that the open, i.e. liner-free pressure-sensitive-adhesive side thereof is adhesive-bonded to a substrate. During this process, the other pressure-sensitive-adhesive side continues to adhere on the coated surface of the liner to an extent that is sufficient to permit handling of the adhesive tape.

The liner can be peeled from the adhesive tape, and neither the liner itself nor the peeling of the liner should substantially impair the adhesion of the adhesive for the subsequent use.

The usual procedure for the production of liners equips the paper- or foil-based backing with an antiadhesive coating (release coating) in order to reduce the tendency of the adhesive to adhere to said surfaces. This coating is preferably applied to both sides.

Crosslinkable silicone systems are often used as release coating. Among these are mixtures made of crosslinking catalysts and of what are known as thermally curable condensation- or addition-crosslinking polysiloxanes. In the case of condensation-crosslinking silicone systems, tin compounds such as dibutyltin diacetate are often present as crosslinking catalysts in the composition.

The term liner is used throughout hereinafter for the protective covering material or the release material.

A problem with many liners is that it is difficult to release these from the adhesive covered thereby. Said problem arises in particular when the width of the liner is the same as the width of the covered adhesive, and the liner does not therefore protrude. It can then prove difficult to achieve grip on at least one portion of the liner, in order to achieve release.

In particular during further processing of the covered adhesive tapes in machinery, it can be an essential requirement that a liner can be removed without difficulty.

In order to facilitate the handling of this type of adhesive/liner combination, liners are applied which are wider than the adhesive to be covered. This gives a protruding liner which permits better release of the liner from the adhesive, because the protruding region of the liner serves as a tag that can be gripped.

Another problem of many adhesive tape rolls is solved at the same time, namely edge tack. When adhesive tape rolls are placed with their flat side on to a substrate, a possible result is that the contact between adhesive and substrate causes the roll to stick to the substrate. Furthermore, particularly in the case of adhesive layers that are thick or have high tack, said edge tack can cause the wound laps of the adhesive tape roll to stick to one another, and then prevent unwinding of the adhesive tape from the roll. A high level of edge tack can also hinder the transport and the storage of the adhesive tape roll, when the roll is transported or stored while lying on its side without any antiadhesive interlay.

A protruding liner eliminates the disadvantages described. It prevents contact between two adjacent adhesive layers, and ensures that there is a space separating the side of the adhesive roll from a substrate. It also renders the interlay superfluous.

Single-sided adhesive tapes are usually composed of a backing material on to which an adhesive has been applied on one side. The free side of the adhesive can then also have been covered with a liner.

Double-sided adhesive tapes mostly have a backing equipped on both sides with an adhesive coating. The two adhesives can be identical, but they can also be different. At least one of the two adhesive layers has been covered with a liner in order to prevent direct contact between the two adhesive layers in the adhesive tape roll. The second adhesive can moreover also have been covered with a second liner.

It is not essential that double-sided adhesive tapes have a backing. The term double-sided adhesive tapes is also used for a simple adhesive layer or two or more adhesive layers laminated to one another.

DETAILED DESCRIPTION OF THE DISCLOSURE

Figure 1:
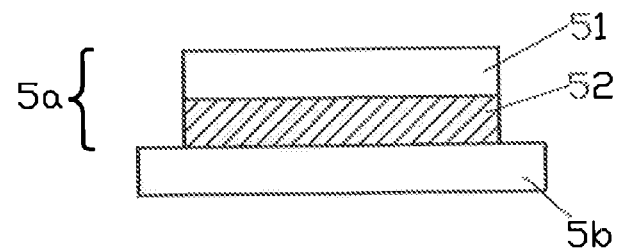
FIG. 1 illustrates a side plan view of an adhesive tape with a protruding liner in an embodiment.

FIG. 1 depicts a double-sided adhesive tape 5a, where the adhesive tape 5a is composed of a simple adhesive layer 52. The lower side of the adhesive layer has been covered with a first liner 5b, which protrudes beyond both edges of the adhesive 52. The upper side of the adhesive 52 has been equipped with a second liner 51, which has the same width as the adhesive 52. Upper liner 51 and adhesive layer 52 form the adhesive tape 5a.

A disadvantage of adhesive tapes with protruding liner is complicated manufacture.

Adhesive tapes are usually produced by unrolling a wide roll of backing material and then equipping same with an adhesive. Said adhesive can then be covered with a liner. After possible further processing steps such as drying, the backing material equipped with adhesive, termed adhesive tape web, is wound up together with liner to give what is known as a stock roll. For the cutting process, the stock roll is unwound, and the adhesive tape web covered with a liner is fed to an appropriate cutting apparatus in which the adhesive tape web is cut into individual adhesive tapes which are then usually wound on cores made of, for example, paperboard or plastic. The cutting process can also take place directly after manufacture, i.e. without wind-up and, in turn, unwinding of the adhesive tape web together with liner.

Another production process for adhesive tapes uses a parting process for direct production of adhesive tape rolls from a jumbo roll or stock roll.

It is moreover possible that the adhesive tape web is cut without liner and that the liner is applied at the appropriate width to the open adhesive side after the cutting procedure.

If the adhesive tape is composed of a simple adhesive layer (being what is known as a transfer adhesive tape), i.e. has no backing, said layer is usually applied directly to a liner.

In this case, the expression adhesive tape web is used for the uncut adhesive layer.

When the adhesive tape web equipped with a liner is cut, an additional narrow strip can be separated in the edge region of each individual adhesive tape, without any separation at that location of the liner situated thereunder. The narrow strip is then removed before the adhesive tape is wound up to give a roll, and a region free from adhesive is thus produced at one edge of the adhesive tape. It is also possible to cut and remove narrow strips at both edges of the adhesive tape in such a way that the liner protrudes at both edges of the adhesive tape. A disadvantage of this process is that the adhesive tape becomes narrower and that there is an attendant loss of material.

The manufacture of the covered adhesive tapes is achieved by feeding adhesive tape and liner to a lamination unit in which the liner is applied on to the open adhesive side and then the covered adhesive tape is fed, mostly by way of further deflection systems, to a wind-up unit.

The lamination unit can be a nip formed by two rolls, and the wind-up unit can be a further roll which bears the core on to which the covered adhesive tape is wound up.

By virtue of the long distances traversed by the adhesive tape, the liner, and the subsequent covered adhesive tape through a plurality of units and by way of a plurality of deflection devices, it is very difficult to keep the web tension constant at the desired value, in particular at the wind-up point.

If winding tension is not ideal, creases and undesired tension effects arise in the laminated material and can lead by way of example to telescoping of the finished roll.

The winding of crosswound rolls with large running lengths, known as SAF rolls, is particularly problematic. Typical running lengths start from 2500 meters and are up to 50 000 meters.

It is an object of the invention to eliminate the disadvantages of the prior art. A particular object is to state a process which can produce an adhesive tape with protruding liner and which is of simple design in terms of process technology and which can be operated in such a way that it leads to no losses of adhesive tape, and which substantially avoids variations in winding tension during the winding procedure, and which permits crosswinding of the adhesive tape to give a long roll.

Said object is achieved via the processes set out in the two main claims. The dependent claims provide advantageous embodiments of the process.

Accordingly, the invention provides processes for the production of a crosswound long roll of an at least single-side-adhesive adhesive tape in which the at least one adhesive side has been covered with a liner, in the form of an Archimedean spiral, where these differ only in that adhesive tape and liner are differently guided.

In a first embodiment, the invention comprises a process for the production of a crosswound long roll of an at least single-side-adhesive adhesive tape in which the at least one adhesive side has been covered with a liner, in the form of an Archimedean spiral, where a core has been releasably fixed on an axle, and the adhesive tape covered with the liner is wound on to this core, a pressure roll is in contact with the curved surface of the core or with the adhesive tape which has been covered with the liner and which has already been wound on the core, in such a way as to give a nip between pressure roll and curved surface of the core or adhesive tape covered with the liner, where core and pressure roll rotate in opposite directions, the liner is unwound from a liner roll, the liner is placed on to the at least one open adhesive side of the adhesive tape which is guided on the pressure roll in the direction of the nip, and the laminate made of adhesive tape and liner is guided on the pressure roll into the nip, the adhesive tape covered with the liner is wound up on the core, where the liner roll of the liner and the pressure roll are moved to and fro synchronously in a movement parallel to the axis of the long roll, where the liner is wider than the adhesive tape (based in each case on the transverse direction of liner and adhesive tape), and is laminated on to the adhesive tape in such a way that it protrudes at both edges of the adhesive tape.

According to a second embodiment, the invention comprises a process for the production of a crosswound long roll of an at least single-side-adhesive adhesive tape in which the at least one adhesive side has been covered with a liner, in the form of an Archimedean spiral, where a core has been releasably fixed on an axle, and the adhesive tape covered with the liner is wound on to this core, a pressure roll is in contact with the curved surface of the core or with the adhesive tape which has been covered with the liner and which has already been wound on the core, in such a way as to give a nip between pressure roll and curved surface of the core or adhesive tape covered with the liner, where core and pressure roll rotate in opposite directions, the adhesive tape, preferably on the pressure roll, is guided in the direction of the nip, the liner is unwound from a liner roll, the adhesive tape and the liner are guided at the same time and from the same side into the nip, in said nip, the liner is laminated on to the at least one open adhesive side, the adhesive tape covered with the liner is wound up on the core, where the liner roll of the liner and the pressure roll are moved to and fro synchronously in a movement parallel to the axis of the long roll, where the liner is wider than the adhesive tape (based in each case on the transverse direction of liner and adhesive tape), and is laminated on to the adhesive tape in such a way that it protrudes at both edges of the adhesive tape.

The axle with the core is advantageously driven in such a way that friction causes the pressure roll to rotate in a direction opposite to that of the core.

It is further preferable that the pressure roll has been mounted pivotably, and the position of the pressure roll can therefore adapt to the increasing diameter of the roll with covered adhesive tape. It is preferable that the pressure applied at the pressure roll is mechanical, very particularly from a pneumatic system.

It can be advantageous for the pressure roll to have an antiadhesive surface, for example made of Teflon.

It is further preferable that the liner is located on a liner roll, and is unwound therefrom, and thereby is guided in the direction of the nip, where the point at which the liner leaves the liner roll is at most 50 cm distant from the nip, and/or between liner roll and nip the liner is not guided by way of any deflector roll. It is preferable that both possibilities are realized at the same time.

By virtue of said short distance, the web tension in the liner can be kept very constant as far as the nip.

It is further preferable that the liner roll has been mounted movably, for example pivotably, and the point at which the liner leaves the liner roll is therefore always at a constant distance from the nip.

In the liner roll, which is preferably not driven, there can then be a spring brake present in such a way that variations in the tension in the liner during the unwind procedure can be minimized.

In order to supply the adhesive tape at a prescribed position from the unwind roll as it enters the process, the adhesive tape is fed to the pressure roll by way of a guide sleeve.

The guide sleeve can assume a shape which—expressed mathematically—is that of a single-sheet hyperboloid of revolution. The shape of the guide sleeve can moreover be that of a tubular sleeve with protruding flat areas at the sleeve ends.

The guide sleeve has preferably been equipped with antiadhesive properties.

It is preferable that the guide sleeve is moved to and fro synchronously with the liner roll and with the pressure roll in a movement parallel to the axis of the long roll.

It is further preferable that optionally guide sleeve, liner roll, and pressure roll have been secured on an arm which moves axially together with optionally guide sleeve, liner roll, and pressure roll.

The adhesive tape can be a simple adhesive layer (which in turn can be composed of one, two, or more adhesive layers), a backing material equipped with an adhesive on one side, or a backing material equipped with an adhesive on both sides, where in the latter case the second adhesive can also have been covered with a further liner.

The following can by way of example be used as backing material in the form of a tape: nonwovens, papers, oriented PP, HDPE, LDPE, PVC, and PET foils, and also foams (for example PE foams or PVA foams), and woven fabrics, but this list is not exclusive.

It is preferable to use, as liners, single-side- or double-side-antiadhesive-coated backing materials such as paper, in particular coated paper such as PE paper, oriented PP, HDPE, LDPE, PVC, MOPP, BOPP, PEN, PMP, PA, and/or PET foils. Particular preference is given to silicone-coated liners, and also to liners which have silicone-free release layers, an example being paraffin, Teflon, or waxes. Composite materials can also be used as liners, an example being PET/aluminum foil.

Adhesive used can comprise any of the known adhesives, for example adhesives based on solvent-containing natural-rubber compositions and acrylate-adhesive compositions; solvent-free adhesives can also be used.

The term "cutting" also subsumes punching processes.

It is preferable that the process is carried out continuously.

In the invention, the liner is wider than the adhesive tape (based in each case on the transverse direction of liner and adhesive tape), and is laminated on to the adhesive tape in such a way that it protrudes at both edges of the adhesive tape.

The width of the adhesive tape can be from 5 to 50 mm, preferably from 10 to 19 mm. It is preferable to manufacture adhesive tapes of width from 6 to 12 mm.

It is preferable that the liner protrudes respectively 2 mm both edges of the adhesive tape. It is also possible, of course, to select other amounts of protrusion.

Advantageous embodiments of the process are presented with reference to the figures described in more detail below, but neither these nor the figures are to be understood as restrictive.

Figure 2:
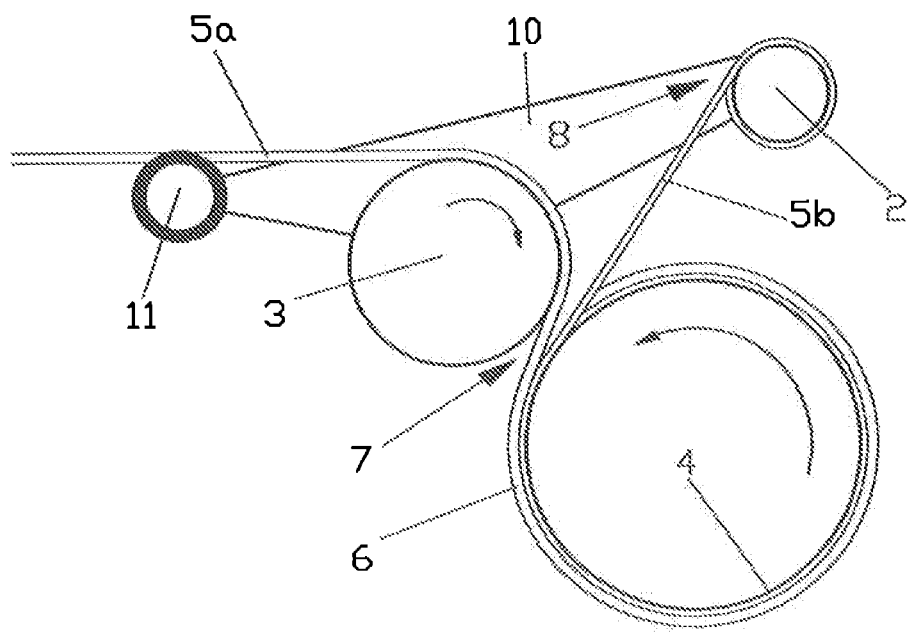
FIG. 2 illustrates a side plan view of a method or process for producing an adhesive tape with a protruding liner in an embodiment.

FIG. 2 depicts a possible process for the production of a long roll 6 of an at least single-side-adhesive adhesive tape 5a in which the at least one adhesive side has been covered with a liner 5b.

To this end, a core 4 made of plastic or paperboard has been releasably fixed on an axis (not shown), which is driven, and the adhesive tape 5a covered with the liner 5b is wound on to this core.

The adhesive tape 5a is supplied from a roll, and at the same time the liner 5b is supplied from a liner roll 2.

The adhesive tape 5a is guided by way of a guide sleeve 11 in the direction of pressure roll 3. The liner 5b is likewise guided in the direction of pressure roll 3, whereupon the liner 5b is placed on to the at least one open adhesive side of the adhesive tape 5a in such a way that the location of the liner 5b is between adhesive tape 5a and pressure roll 3.

The laminate produced from adhesive tape 5a and liner 5b is guided on the pressure roll 3 into the nip 7 formed between pressure roll 3 and curved surface of the core 4 or—after first laps of the covered adhesive tape 5a have been wound on the core 4—with the adhesive tape 5a covered with the liner 5b and already located on the core 4. As shown, core 4 and pressure roll 3 rotate in opposite directions. Adhesive tape 5a and liner 5b are therefore guided simultaneously and from the same side into the nip 7.

The liner roll 2 of the liner 5b and the pressure roll 3 are moved to and fro synchronously in a movement which preferably has a constant velocity parallel to the axis of the long roll 6.

In said nip 7, the liner 5b is laminated on to the open adhesive side of the adhesive tape 5a. Finally, the adhesive tape 5a covered with the liner 5b is wound up on the core 4, and this gives a crosswound long roll 6.

In order that said movement can proceed particularly synchronously, guide sleeve 11, liner roll 2, and pressure roll 3 have been secured on a lever 10 which moves axially together with the guide sleeve 11, the liner roll 2, and the pressure roll 3.

Again it should be noted that the liner 5b is wider than the adhesive tape 5a (based in each case on the transverse direction of liner 5b and adhesive tape 5a), and that the liner is laminated on to the adhesive tape 5a in such a way that the liner protrudes at both edges of the adhesive tape 5a.

The point 8 at which the liner 5b leaves the liner roll 2 is at most 50 cm distant from the nip 7, and moreover there is no further deflector roll present between liner roll 2 and nip 7; undesirable tension effects in the liner 5b cannot therefore occur, and in particular undesirable tension effects in the long roll 6 are also substantially avoided, with a resultant marked increase in the winding quality of the long roll 6.

Again, the adhesive tape 5a is not guided by way of any further deflector roll, but instead is guided from the roll directly to the pressure roll 3 by way of the guide sleeve 11 that is preferably provided.

Figure 3:
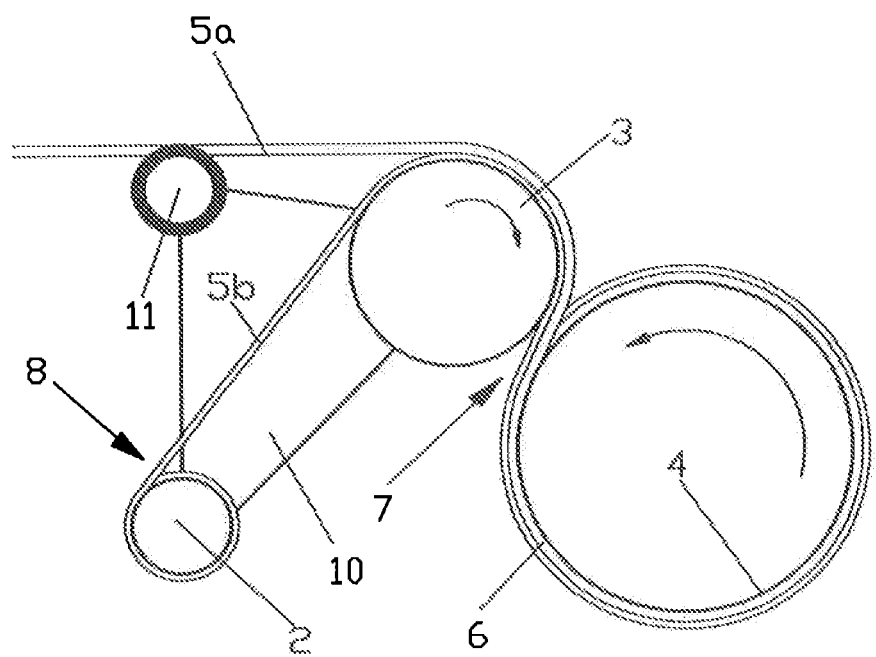
FIG. 3 illustrates a side plan view of a method or process for producing an adhesive tape with a protruding liner in an embodiment.

FIG. 3 shows a variant of the processes of the invention. In contrast to the previous process, the adhesive tape 5a and the liner 5b are guided simultaneously and from the same side into the nip 7, but specifically in such a way that the liner 5b is below the adhesive 5a on the long roll 6 (the radial distance of the liner 5b from the axis of the long roll 6 being greater than that of the associated lap of adhesive tape 5a).

The adhesive tape 5a is guided by way of a guide sleeve 11 to the pressure roll, and is in contact with this roll over an angle of about 135°. The onward transport in the direction of nip 7 takes place on the pressure roll 3.

The liner 5b is guided from a liner roll 2 directly into the nip 7, where it is laminated on to the at least one open adhesive side of the adhesive tape 5a.

The adhesive tape 5a covered with the liner 5b is wound up on the core 4.

Again, the liner roll 2, the pressure roll 3, and the guide sleeve 11 are located on a lever 10, and are moved synchronously to and fro, preferably at a constant velocity parallel to the axis of the long roll 6, thus giving a crosswound roll 6.

Figure 4:
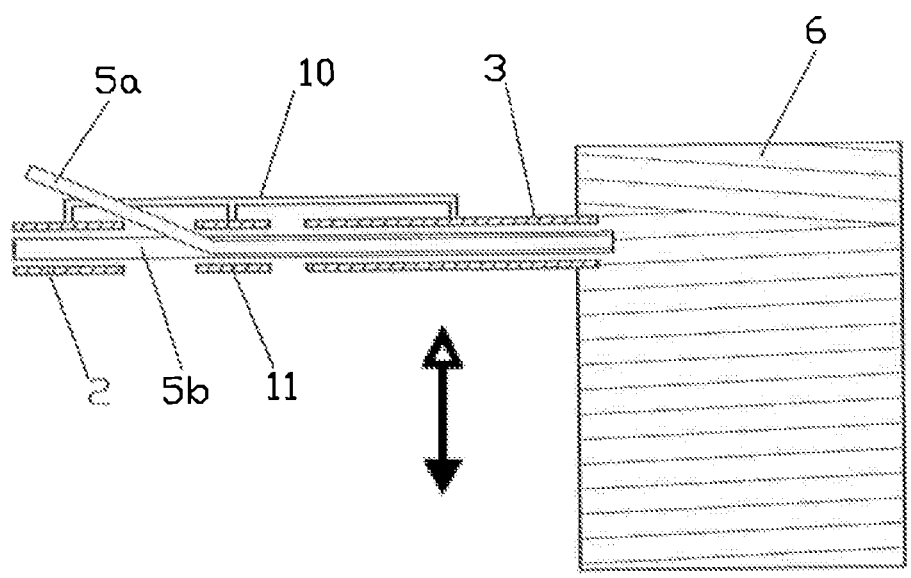
FIG. 4 illustrates a top plan view of a method or process for producing an adhesive tape with a protruding liner in an embodiment.

FIG. 4 shows the process of FIG. 2 as seen when the individual parts of the system are viewed from above.

The adhesive tape 5a is unwound and fed by way of the guide sleeve 11 to the pressure roll 3. The liner 2 is unwound from the liner roll 2 and likewise fed to the pressure roll 3.

On the pressure roll 3, the liner 5b is placed from below on to the at least one open adhesive side of the adhesive tape 5a, in such a way that the location of the liner 5b is between adhesive tape 5a and pressure roll 3.

The laminate produced from adhesive tape 5a and liner 5b is guided on the pressure roll 3 into the nip 7 formed between pressure roll 3 and the first laps with the adhesive tape 5a covered with liner 5b and already located on the core 4.

Guide sleeve 11, liner roll 2, and pressure roll 3 have been fastened to a lever 10 which moves axially together with the guide sleeve 11, the liner roll 2, and the pressure roll 3, in an axial direction in relation to the core, i.e. in the direction indicated by the arrow.

By virtue of the to-and-fro movement at a preferably constant velocity (indicated by the arrow) the result is not, as is conventional, an adhesive tape roll in the form of an Archimedean spiral in which all of the laps of the adhesive tape are placed exactly on top of one another, but instead is a crosswound adhesive tape roll in the form of an Archimedean spiral: i.e. the individual laps of the adhesive tape are placed at an angle on to the roll (and are not therefore at right angles to the axis of the roll, as is conventional).

In FIG. 4, the lever arm 10 is currently moving in the direction of the solid arrow head.

The liner 5b is wider than the adhesive tape 5a (based in each case on the transverse direction of liner 5b and adhesive tape 5a), and the liner is laminated on to the adhesive tape 5a in such a way that the liner protrudes at both edges of the adhesive tape 5a.

A great advantage of the process of the invention is that the process can be operated without any loss of adhesive tape sections.

Nevertheless, the scope of the invention covers situations where this advantage is not utilized and by way of example a narrow strip is also separated from the adhesive tapes, and is removed prior to roll-up of the adhesive tape.

What is claimed is:

1. A process for production of a crosswound long roll of an at least single-side-adhesive adhesive tape, wherein at least one adhesive side of the adhesive tape has been covered with a liner, wherein the crosswound long roll is in the form of an Archimedean spiral, the process comprising
   releasably fixing a core on an axle, wherein adhesive tape covered with the liner is wound on to the core,
   fastening a liner roll, a guide sleeve and a pressure roll to a movable lever, wherein cylindrical bodies of the guide sleeve and the liner and pressure rolls, when viewed from above, are parallel with respect to each other and co-planar defining a single plane,
   contacting the pressure roll with a curved surface of the core or with the adhesive tape which has been covered with the liner and already wound on the core, in such a way as to give a nip between the pressure roll and the curved surface of the core or the adhesive tape covered with the liner, wherein the core and the pressure roll rotate in opposite directions,
   unwinding the liner from the liner roll,
   feeding the adhesive tape into the single plane onto the guide sleeve between the liner and pressure rolls, wherein the adhesive tape is fed to the guide sleeve at an angle with respect to the single plane defined by the parallel and co-planar liner roll, guide sleeve and pressure roll,
   placing the liner onto the at least one open adhesive side of the adhesive tape which is guided on the pressure roll in the direction of the nip,
   guiding a laminate made of the adhesive tape and the liner on the pressure roll into the nip, and
   moving the lever, with the guide sleeve and the liner and pressure rolls, in an axial direction with respect to the core while winding up the adhesive tape covered with the liner onto the core,
   wherein the liner is wider than the adhesive tape, based in each case on the transverse direction of the liner and the adhesive tape, and is laminated on to the adhesive tape such that the liner protrudes at both edges of the adhesive tape.

2. A process for the production of a crosswound long roll of an at least single-side-adhesive adhesive tape, wherein the at least one open adhesive side of the adhesive tape has been covered with a liner, wherein the crosswound long roll is in the form of an Archimedean spiral, the process comprising
   releasably fixing a core on an axle, and the adhesive tape covered with the liner is wound onto the core,
   fastening a pressure roll, a guide sleeve and a liner roll to a movable lever, wherein cylindrical bodies of the guide sleeve and the liner and pressure rolls, when viewed from above, are parallel with respect to each other and co-planar defining a single plane,
   contacting the pressure roll with a curved surface of the core or with the adhesive tape which has been covered with the liner and already wound on the core, in such a way as to give a nip between the pressure roll and the curved surface of the core or the adhesive tape covered with the liner, wherein the core and the pressure roll rotate in opposite directions,
   feeding the adhesive tape into the single plane onto the guide sleeve between the liner and pressure rolls, wherein the adhesive tape is fed to the guide sleeved at an angle with respect to the single plane defined by the parallel and co-planar pressure roll, guide sleeve and liner roll, guiding the adhesive tape, on the pressure roll, in the direction of the nip, unwinding the liner from the liner roll, guiding the adhesive tape and the liner at the same time and from the same side into the nip, wherein, in said nip, the liner is laminated onto the at least one open adhesive side, and winding up the adhesive tape covered with the liner on the core while moving the lever, with the guide sleeve and the pressure and liner rolls, in an axial direction with respect to the core, wherein the liner is wider than the adhesive tape, based in each case on the transverse direction of the liner and the adhesive tape, and is laminated onto the adhesive tape such that the liner protrudes at both edges of the adhesive tape.

3. The process according to claim 1, wherein the axle with the core is driven such that friction causes the pressure roll to rotate in a direction opposite to that of the core.

4. The process according to claim 1, wherein the pressure roll has been mounted pivotably, and a position of the pressure roll is adaptable to a increasing diameter of the core that has been covered with the adhesive tape.

5. The process according to claim 1, wherein the liner is located on the liner roll, and is unwound therefrom, and thereby is guided in the direction of the nip, where a point at which the liner leaves the liner roll is at least one of (i) at most 50 cm distant from the nip, and (ii), between liner roll and nip, the liner is not guided by way of any deflector roll.

6. The process according to claim 5, wherein the liner roll has been mounted movably, and the point at which the liner leaves the liner roll is at a constant distance from the nip.

7. The process according to claim 1, wherein the adhesive layer is composed of one or more adhesive layers and a backing material equipped with an adhesive on one side, or a backing material equipped with an adhesive on both sides.

8. The process according to claim 1, wherein the process is carried out continuously.

9. The process according to claim 1, wherein axial movement of the lever crosswinds the adhesive tape, in the form of an Archimedean spiral, onto the core.

10. The process according to claim 1, further comprising:
maintaining web tension in the liner as far away from the liner roll as the nip.

11. The process according to claim 1, wherein the liner roll is a spring brake.

12. The process according to claim 1, wherein the guide sleeve has a shape that is, expressed mathematically, a single-sheet hyperboloid of a revolution.

13. The process according to claim 1, wherein the guide sleeve has a shape of a tubular sleeve with protruding flat areas at ends of the sleeve.

14. The process according to claim 1, wherein at least a portion of the liner is located between the adhesive tape and the pressure roll.

\* \* \* \* \*